S. Whitman,
Cam Lever.
No. 99,991. Patented Feb. 15, 1870.
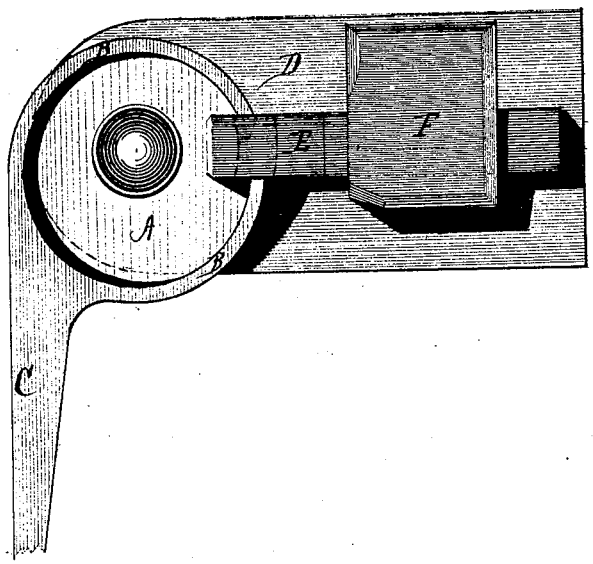
Witnesses
C. L. Evert
A. A. Speakman
Inventor
Silas Whitman
per Alexander Mason
Atty

United States Patent Office.

SILAS WHITMAN, OF LONDONDERRY, VERMONT.

Letters Patent No. 99,991, dated February 15, 1870.

IMPROVEMENT IN CAM-LEVERS.

The Schedule referred to in these Letters Patent and making part of the same.

*To all whom it may concern:*

Be it known that I, SILAS WHITMAN, of Londonderry, in the county of Windham, and in the State of Vermont, have invented certain new and useful Improvements in Cam-Levers; and do hereby declare that the following is a full, clear, and exact description thereof, reference being had to the accompanying drawings and to the letters of reference marked thereon, making a part of this specification.

The nature of my invention consists in the construction of a cam by the use of which is obviated the necessity of having springs, &c., to bring back to place anything which the cam has pressed down.

In order to enable others skilled in the art to which my invention appertains to make and use the same, I will now proceed to describe its construction and operation, referring to the annexed drawings, which represent the cam and an attachment, to show the manner of working the same.

A represents the cam, which on its upper or front side along its circumference is provided with a raised flange, B, and on one side with a handle or lever, C.

D represents the article to which the cam is pivoted.

E is the bolt or punch, &c., that the cam operates, which moves in a guide, F, and is grooved on its inner side in such a manner as to grasp the flange B.

This cam may be used on power-punches, tire-upsetting machines, or any other machine where a cam is needed, and will do away with springs, &c., to bring back to place anything which the cam has pressed down.

Having thus fully described my invention,

What I claim as new, and desire to secure by Letters Patent, is—

The combination of the cam A, with its circumferential flange B and handle C, with the grooved grasp and slide E and keeper F, all substantially as set forth.

In testimony that I claim the foregoing, I have hereunto set my hand this 28th day of August, 1869.

SILAS WHITMAN.

Witnesses:
R. E. GORDON,
C. A. WHITMAN.